Aug. 3, 1954          L. WALLERSTEIN, JR          2,685,425
                         MOUNTING SYSTEM
Filed Feb. 21, 1949                          3 Sheets-Sheet 1
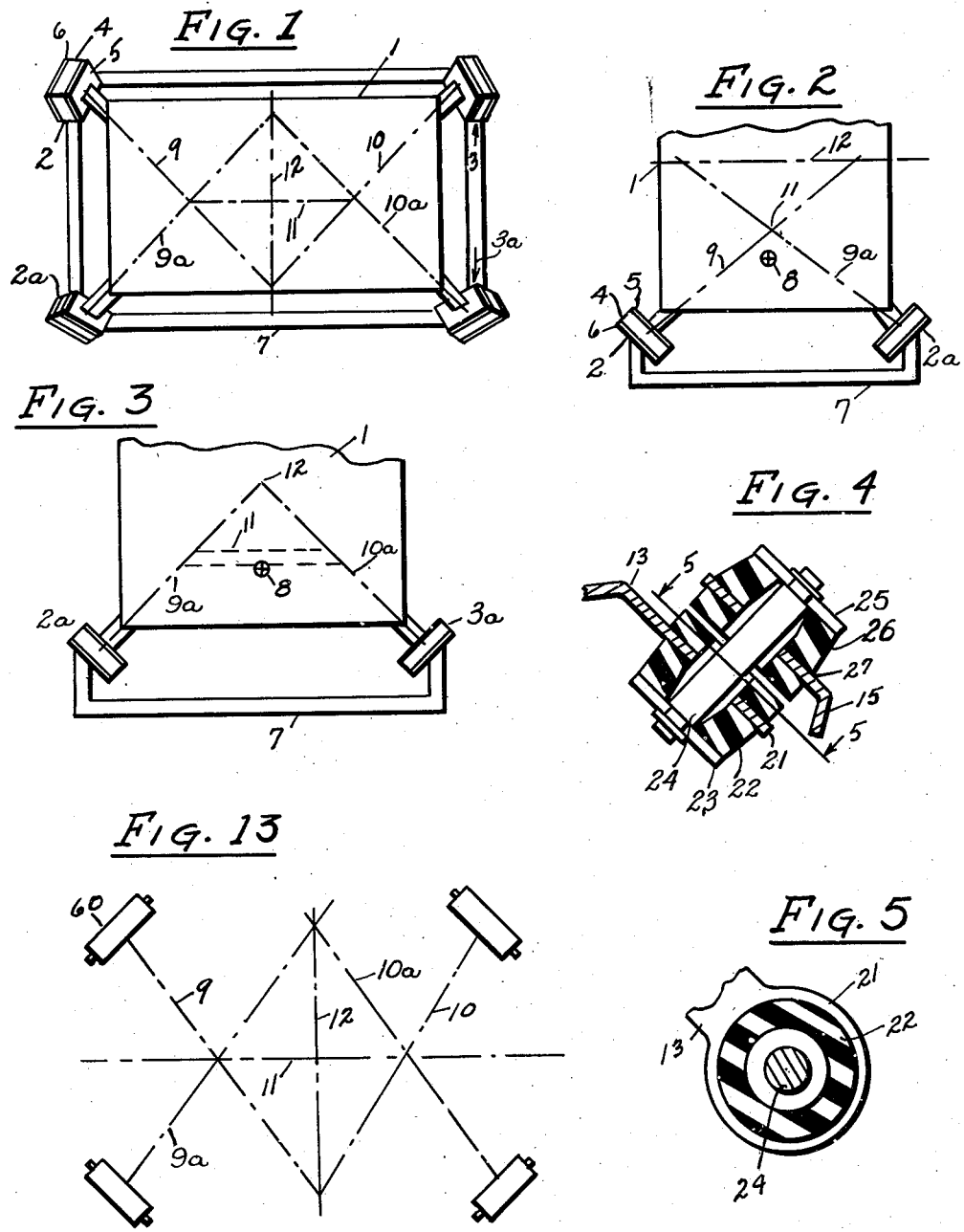
Inventor
Leon Wallerstein Jr
Ralph Hammas
Attorney Aug. 3, 1954  L. WALLERSTEIN, JR  2,685,425
MOUNTING SYSTEM
Filed Feb. 21, 1949  3 Sheets-Sheet 2

Inventor
Leon Wallerstein Jr
By Ralph Hammar
Attorney

Aug. 3, 1954  L. WALLERSTEIN, JR  2,685,425
MOUNTING SYSTEM
Filed Feb. 21, 1949  3 Sheets-Sheet 3
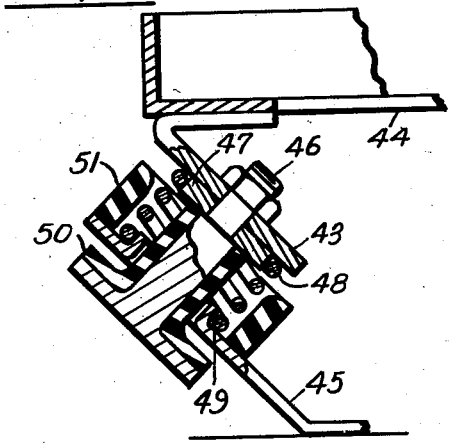
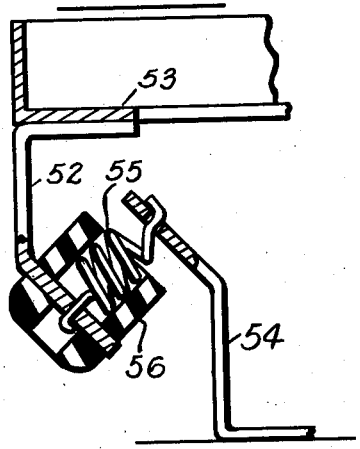
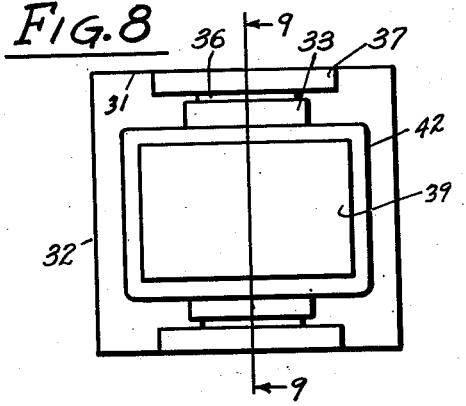
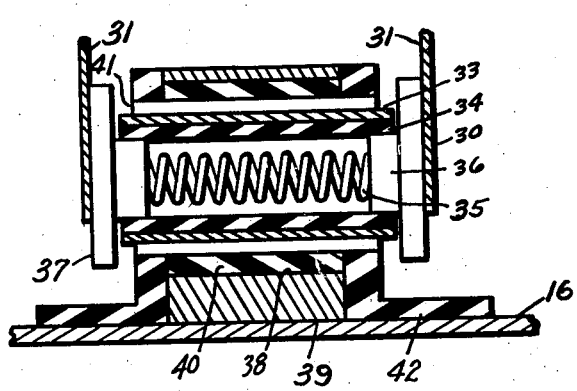
Inventor
Leon Wallerstein Jr
By Ralph Hammar
Attorney Patented Aug. 3, 1954

2,685,425

UNITED STATES PATENT OFFICE 2,685,425

MOUNTING SYSTEM

Leon Wallerstein, Jr., Erie, Pa., assignor to Lord Manufacturing Company, Erie, Pa., a corporation of Pennsylvania Application February 21, 1949, Serial No. 77,543

4 Claims. (Cl. 248—358)

This invention is a resilient mounting system, whose supporting or mounting plane is remote from the center of gravity of the supported body, advantageous in situations where the attaching points are not equally spaced about a normal from the center of gravity to the mounting plane, or in which the supported body has unsymmetrical inertia characteristics about axes at right angles to each other and parallel to the mounting plane. In one application the attaching points may be located at the ends of the supported body closer to the longitudinal axis of the supported body than to a cross axis through the center of gravity of the supported body. Another application of the mounting system is where the supported body has different moments of inertia about the longitudinal and cross axes either because the body is elongated along one of the axes, or because of unsymmetrical weight distribution.

The mounting system makes use of mountings arranged in pairs at opposite ends of the supported body and focused to intersect on cross axes. That is, the mountings at each end of the body are focused to intersect on a longitudinal axis while the mountings at each side of the body are focused to intersect on an axis crosswise to the longitudinal axis. The mountings are stiffest along the focal lines and are softest in at least one direction at right angles to the focal lines. With this mounting arrangement it is possible to obtain an effective support in the region of the center of gravity of the supported body although the mountings are remote from the center of gravity. This permits effective isolation of all of the modes of vibration about the center of gravity of the supported body, while at the same time limiting the movement of the supported body so that the body is stably supported. This mounting system is peculiarly adapted to mobile equipment in that the vibration isolation is the same on an incline as on the level. Further objects and advantages appear in the specification and claims.

Figure 6:
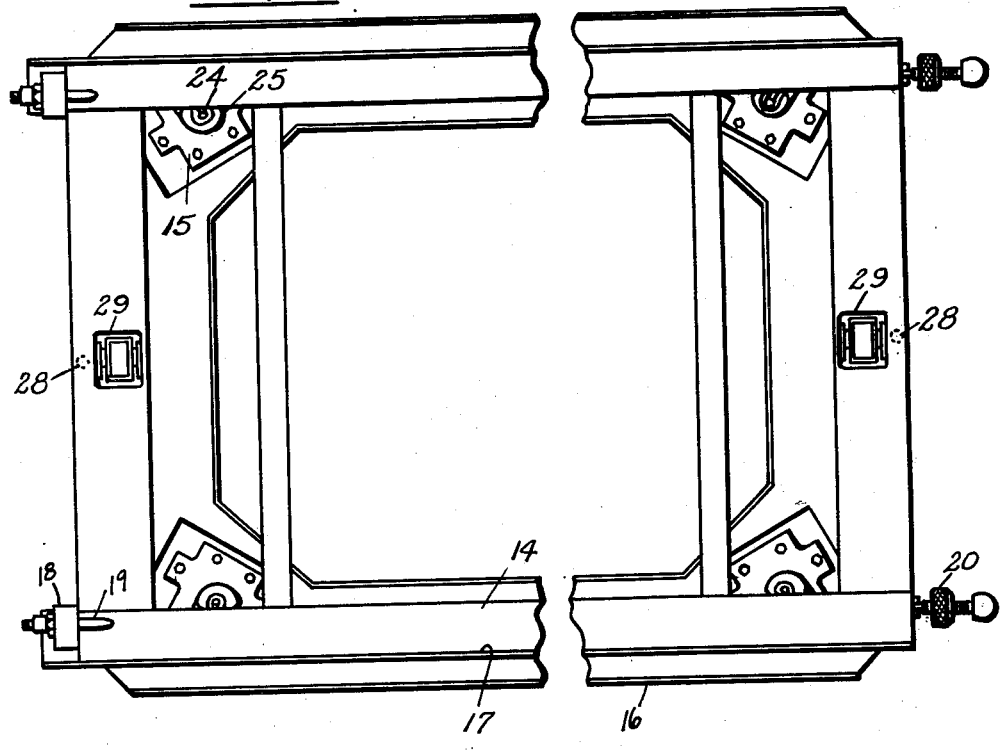
Figure 7:
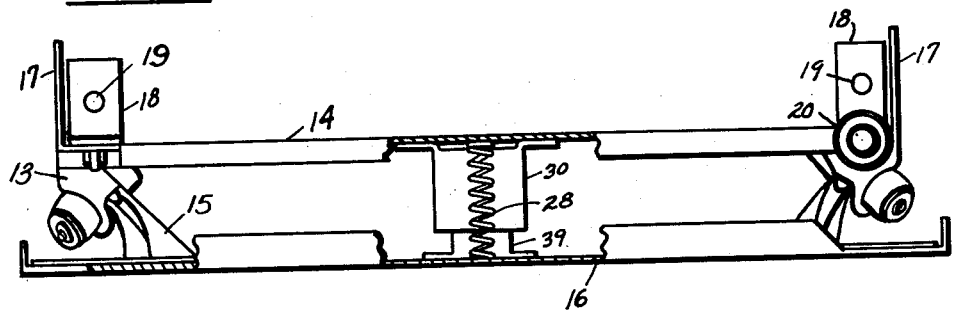
Figure 12:
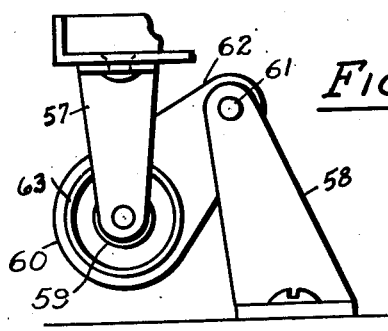

In the drawings, Fig. 1 is a diagrammatic top view of a mounting system; Fig. 2 is a diagrammatic end view; Fig. 3 is a diagrammatic side view; Fig. 4 is a section through a modification of one of the mountings; Fig. 5 is a section on line 5—5 of Fig. 4; Fig. 6 is a top plan view of a mounting system using the Fig. 4 mounting; Fig. 7 is an end elevation of the Fig. 6 mounting system; Fig. 8 is a top plan view of one of the friction dampers used in the Fig. 6 mounting system; Fig. 9 is a section on line 9—9 of Fig. 8; Figs. 10 and 11 are side views of coil spring mountings; Fig. 12 is a side elevation of a link type mounting, and Fig. 13 is a diagrammatic plan view of a mounting system using links.

In Fig. 1, 1 indicates a body supported at each end by pairs of sandwich mountings 2, 2a, 3, 3a. Each mounting comprises rubber or equivalent resilient material 4 sandwiched between and bonded to opposing faces of plates 5 and 6 respectively fixed to the body 1 and to a base 7. The mountings are softest in directions edgewise of the plates in which the rubber is stressed in shear and are stiffest in directions normal to the plates in which the rubber is stressed in direct stress (compression or tension). In other words, the mountings have a directional response which is expressed by the ratio of the stiffness along an axis normal to the plates (the focal axis) 5 and 6 to the stiffness edgewise of the plates. This ratio (commonly known as the L-value) may be of the order of from 3 to 10 or more.

In the mounting system advantage is taken of the directional response, or L-value, of the mounting to more effectively support the body 1 in the region of its center of gravity 8.

The mountings 2, 2a, and 3, 3a are focused along lines 9, 9a, and 10, 10a intersecting on a longitudinal axis 11 above the center of gravity 8. The mountings 2, 3, and 2a, 3a, are focused to intersect on an axis 12 extending crosswise of the axis 11 defined by the intersection of lines 9, 10 and 9a, 10a. The axis 12 is likewise above the center of gravity 8. Although the apparent location of the axis 11 and 12 is considerably above the center of gravity 8, the body 1 is effectively supported about axes parallel to the cross axes 11 and 12 below the apparent location of the axes 11 and 12 and crossing in the region of the center of gravity 8. This is due to the fact that the mountings have some resilience along the focal lines 9, 9a, 10, 10a which foreshortens the focusing effect of the mountings. Only in the impractical case where the mountings are rigid along the focal lines 9, 9a, 10, 10a, would the supporting axes 11 and 12 correspond to the apparent axes indicated by the intersection of the focal lines.

By having the cross axes 11 and 12 provide effective axes of support passing through the region of the center of gravity of the supported body, the body is effectively supported in the region of its center of gravity so that response to vibratory disturbing forces is as though the restraining forces were applied to the center of gravity of the supported body. This provides what is known as a decoupled mounting system in the sense that translational disturbing forces applied at the center of gravity do not excite rotation of the body, and conversely, vibratory disturbing couples do not excite translational response. Of course, the effectiveness of the decoupling depends on the location of the effective axes of support below and parallel to the cross axes 11 and 12 with respect to the center of gravity of the supported body. Perfect decoupling will be obtained if the effective axes pass through the center of gravity. Practical decoupling will be obtained if these effective axes pass through the region of the center of gravity.

The mounting system of Fig. 6 comprises mountings of the structure shown in Figs. 4 and 5 focused along lines 9, 9a, 10, 10a to intersect on the cross axes 11 and 12. Each of the mountings comprise a bracket 13 attached to a frame 14 carrying the supported body and a bracket 15 attached to a base 16. The frame 14 has angle section sides 17 having at one end brackets 18 carrying pins 19 and at the other end hold down clamps 20. The supported body is mounted on the frame 14 by first sliding it into pins 19 and then fastening the hold down clamps 20. Thereafter, the frame 14 and the supported body are equivalent to the body 1 in the Fig. 1 mounting system. The bracket 13 has an annular metal plate 21 bonded to and embedded in the upper part of a ring 22 of rubber or like resilient material. The lower surface of the ring 22 is bonded to a disc 23 fixed to a through bolt 24 extending up through the center of the ring along one of the focal lines 9, 9a, 10, 10a. At the upper end of the bolt is fixed a disc 25 bonded to the upper surface of a rubber ring 26. The lower part of the ring 26 is bonded to and embeds an annular surface 27 on the bracket 15. In effect, the load of the supported body is transmitted in tension from the bracket 13 through the rubber ring 22 to the bolt 24 and from the bolt 24 through the rubber ring 26 to the bracket 15. Although this mounting serves as a tension member the load is transmitted through the rubber rings 22 and 26 in compression. The through bolt 24 in effect serves as a link with rubber universal joints at each end connected to the brackets 13 and 15. Because vibratory movement of the frame 14 is resisted by tension links the mounting system is stable even under the large amplitude vibrations encountered during shock or resonance conditions. A tension link always tends to align itself with the direction of force while a compression member has a tendency to buckle away from the line of force.

At each end of the frame 14 are coil springs 28 which are pre-compressed so as to exert an upward force on the frame substantially equal to the combined weight of the frame and the body supported by the frame. The springs 28 have a very flat spring rate in the sense that the force exerted by the springs is substantially independent of the position of the frame 14. These springs 28 relieve the mountings of the greater part of the gravity load so that the mountings function substantially solely to resist vibration.

The large amplitude vibrations occurring during shock or resonance conditions are dampened by friction dampers 29 adjacent the springs 28 and shown in greater detail in Figs. 8 and 9. The friction dampers comprise a box-shaped member 30 fixed to the under side of the frame 14 and having end walls 31 spaced apart along the longitudinal axis of the mounting system and cross walls 32. Between the end walls 31 is a cylindrical metal tube 33 lined with a rubber tube 34 housing a coil compression spring 35 which bears against hubs 36 on friction washers 37. The spring 35 maintains a friction contact between the washers 37 and the walls 31. The metal tube 33 is received in a cylindrical opening 38 in a bracket 39 fixed to the base 16. The cylindrical opening 38 is lined with a rubber tube 40 which has a clearance 41 between it and the outer surface of the metal tube 33. So long as the vibration of the frame 14 is of insufficient amplitude to take up the clearance 41, the friction washers 37 and walls 31 move together. Whenever the vibration amplitude of the frame exceeds the clearance 41 the tube 33 strikes against the rubber lining 40 and thereafter the washers 37 slide on the walls 31, introducing a friction dampening force. From one aspect the friction dampening is a delayed dampening, or dampening which only comes into effect upon large amplitude vibrations. This is desirable because friction increases the transmission of vibration between the base and frame when the mounting is serving as a vibration isolator. Under normal vibration amplitudes friction dampening is undesirable.

Around the bracket 39 is a rubber bumper 42 which prevents metal-to-metal contact under vibrations of excessive amplitude.

In Figs. 10 and 11 are shown other forms of springs for use in the previously described mounting systems. In Fig. 10 is a compression coil spring mounting having a bracket 43 fixed to a frame 44 carrying a supported body and a bracket 45 for attachment to a base. The bracket 43 has fixed therein a stem 46 having a seat 47 for one end of a coil spring 48. The load is carried in compression through the spring to a seat 49 on the bracket 45. Metal-to-metal contact upon large amplitude vibrations is prevented by rubber bumpers 50, 51 on the stem 46 and bracket 45. The rubber bumpers are effective for snubbing movement in any direction. In Fig. 11 is a tension coil spring mounting having a bracket 52 attached to a frame 53 and a bracket 54 for attachment to a base. The load is carried through a tension coil spring 55 having its ends anchored in the brackets. A rubber sleeve 56 surrounding the spring serves to snub excessive vibrations. Both coil spring mountings are stiffest along the length of the springs and are softest in crosswise directions.

All of the mounting systems so far described use mountings having principal axes in which there is a substantial difference in the spring rate or stiffness. The mountings are arranged so the stiffest axes of the mountings are focused to intersect on cross axes 11, 12 spaced from each other and from the center of gravity of the supported body and providing effective axes of support crossing in the region of the center of gravity.

In Figs. 12 and 13 is shown another modification using hinged link type mountings having brackets 57 and 58 for attachment to supporting and supported members. The bracket 57 is fixed to the center pin 59 of a tube form mounting 60. The bracket 58 carries a hinge pin 61 for a link 62 fixed to the outer shell 63 of the tube form mounting. Forces along the length of the center pin 59 stress the rubber in shear. Forces along the length of the link 62 stress the rubber in direct stress. Forces perpendicular to the link 62 and to the center pin 59 swing the link about the hinge pin 61 with an effectively negligible resistance. The hinged link type mounting differs from the previously described mountings in that one of the principal axes has zero resistance. Like the other mountings, the stiffness is greatest along the length of the link.

One arrangement of the hinge link mountings is diagrammatically indicated in Fig. 13. The tube form mountings are arranged perpendicular to focal lines 9, 9a, 10, 10a corresponding to the focal lines in Fig. 1. The links are arranged on the focal lines so the links intersect on axes 11 and 12. Because each of the links offers substantially zero resistance to swinging about its hinge pin, there is a possibility of a softer suspension for angular modes of vibration which in some circumstances is desirable. In other respects the operation is similar to the other mounting systems.

What I claim as new is:

1. In a resilient mounting system, supporting and supported members, the center of gravity of the supported member being spaced from the supporting member, two pairs of springs connected between the members having principal axes along which the stiffness is different, any two adjacent springs being inclined toward each other, the principal axis of greatest stiffness extending along focal lines pairs of which intersect on two axes respectively located in planes spaced from the supporting member in the same direction and to a greater extent than the center of gravity of the supported member, said planes being spaced from each other and the axis located in one of the planes extending crosswise of the axis located in the other of the planes, and the point at which the projection of the axes transverse to said planes cross being intermediate the springs.

2. The mounting system of claim 1 in which the supporting member comprises a base, the supported member comprises a load carrying frame above the base, and the two pairs of springs are located at each end of the frame with the springs of each pair being on opposite sides of the center of the frame and having in addition preloaded spring means sustaining a portion of the gravity load of the frame and its load on the base.

3. In a resilient mounting system, a base, a load carrying frame above the base, preloaded spring means sustaining the gravity load of the frame and its load on the base, pairs of elastic links connecting the base and frame at the ends of the frame, any two adjacent links being inclined toward each other, each link having a principal axis of greatest stiffness along the length of the links, and the links of each pair being on opposite sides of the center of the frame and having principal axes of greatest stiffness focused toward a longitudinal axis extending between the springs of each pair above the base and also focused toward a cross axis extending between the pairs of springs and a different distance above the base than the longitudinal axis.

4. The mounting system of claim 3 in which the links are hinged about one of the principal axes crosswise of the principal axes of greatest stiffness.

References Cited in the file of this patent

UNITED STATES PATENTS

| Number | Name | Date |
|---|---|---|
| 1,952,102 | Sproul | Mar. 27, 1934 |
| 2,019,052 | Lord | Oct. 29, 1935 |
| 2,076,034 | Lampman | Apr. 6, 1937 |
| 2,148,937 | Gerb | Feb. 28, 1939 |
| 2,329,829 | Clayton | Sept. 21, 1943 |
| 2,377,492 | Gorton | June 5, 1945 |
| 2,385,759 | Henshaw | Sept. 25, 1945 |
| 2,456,612 | Baudry | Dec. 21, 1948 |
| 2,465,790 | Campbell | Mar. 29, 1949 |
| 2,538,954 | Efromson et al. | Jan. 23, 1951 |

FOREIGN PATENTS

| Number | Country | Date |
|---|---|---|
| 546,004 | Great Britain | June 23, 1942 |
| 635,492 | Great Britain | Apr. 12, 1950 |
| 673,631 | Germany | Mar. 9, 1939 |
| 692,713 | Germany | May 30, 1940 |
| 892,351 | France | Apr. 5, 1944 |